United States Patent
Anfuso et al.

[11] Patent Number: 6,147,130
[45] Date of Patent: *Nov. 14, 2000

[54] PROCESS FOR THE PRODUCTION OF EXPANDABLE PARTICLES OF STYRENE POLYMERS

[75] Inventors: Francesco Anfuso; Dario Ghidoni, both of Mantova, Italy

[73] Assignee: Enichem S.p.A., Milan, Italy

[ * ] Notice: This patent is subject to a terminal disclaimer.

[21] Appl. No.: 09/300,312

[22] Filed: Apr. 28, 1999

Related U.S. Application Data

[63] Continuation of application No. 09/015,779, Jan. 29, 1998, Pat. No. 5,935,645.

[30] Foreign Application Priority Data

Jan. 30, 1997 [IT] Italy ................................ MI97A1730

[51] Int. Cl.7 ................................................... C08J 9/224
[52] U.S. Cl. ............................................. 521/57; 427/222
[58] Field of Search ................................ 521/57; 427/222

[56] References Cited

U.S. PATENT DOCUMENTS

| | | |
|---|---|---|
| 3,023,175 | 2/1962 | Rodman, Jr. . |
| 3,480,570 | 11/1969 | Roberts et al. ............................ 521/57 |
| 3,503,908 | 3/1970 | Ingram et al. ............................. 521/57 |
| 3,789,028 | 1/1974 | Heiskel ..................................... 521/57 |
| 4,238,570 | 12/1980 | Shibata et al. . |
| 4,361,656 | 11/1982 | Mostafa ..................................... 521/57 |
| 4,369,227 | 1/1983 | Hahn et al. ................................ 521/57 |
| 4,424,286 | 1/1984 | Nakagawa et al. . |
| 4,556,680 | 12/1985 | Braemer . |
| 4,599,366 | 7/1986 | Kesling, Jr. et al. . |
| 5,286,756 | 2/1994 | Walter . |
| 5,290,819 | 3/1994 | Witt et al. . |
| 5,308,878 | 5/1994 | Anfuso et al. . |

FOREIGN PATENT DOCUMENTS

| | | |
|---|---|---|
| 0 518 140 | 12/1992 | European Pat. Off. . |
| 51-135969 | 11/1976 | Japan . |
| 2-34641 | 2/1990 | Japan . |
| 3-221543 | 9/1991 | Japan . |
| 6-128307 | 5/1994 | Japan . |
| 7-278340 | 10/1995 | Japan . |

*Primary Examiner*—Matthew Foelak
*Attorney, Agent, or Firm*—Oblon, Spivak, McClelland, Maier & Neustadt, P.C.

[57] ABSTRACT

Process for the production of expandable particles of styrene polymers, having improved processability characteristics, which comprises:

i) producing expandable particles of styrene polymers containing from 2 to 20% of an expanding agent incorporated;

ii) covering these particles with an antistatic agent in a quantity of less than 1% by weight;

iii) vigorously frictioning the particles in a mixing apparatus in order to heat their surface, in a short time, by simple mechanical friction;

iv) discharging the particles thus treated from the mixing apparatus.

10 Claims, No Drawings

PROCESS FOR THE PRODUCTION OF EXPANDABLE PARTICLES OF STYRENE POLYMERS

This application is a Continuation of application Ser. No. 09/015,779 filed on Jan. 29, 1998, U.S. Pat. No. 5,935,645.

The present invention relates to a process for the production of expandable particles of styrene polymers having improved processability characteristics.

More specifically, the present invention refers to a process for the production of expandable particles or beads of styrene polymers particularly suitable for the moulding of end-products and blocks having an excellent surface appearance, with low shrinkage, a high sintering degree and with a relatively short residence time in the mould.

The production of expandable particles of styrene polymers, in particular polystyrene, is well known in the art. It schematically comprises the following phases:

inorporation in the polymer, in the polymerization phase, or after, of an expanding agent which boils at a temperature lower than the softening point of the polymer;

washing of the polymer and centrifugation;

drying with air;

screening with the separation of homogeneous fractions (with the possible help of an antistatic agent);

deposition of the coating;

packaging.

The transformation process of expandable styrene polymers is also well known in the art. It essentially consists of the following operative steps:

pre-expansion with vapor at 100–105° C. The expansion is obtained by heating to a temperature higher than the boiling point of the expanding agent and softening point of the styrene polymer;

aging of the pre-expanded particles for 24 hours at room temperature;

final moulding with vapor. For the production of low density expanded blocks and end-products, the pre-expanded particles are arranged in the cavity of a mould which defines the shape of the desired end-article and are subsequently heated to a temperature higher than the boiling point of the expanding agent and softening point of the polymetric material. During this heating, the particles expand and sinter, owing to the limited space available, to form a body having the shape and dimensions of the cavity of the mould used. After the moulding, the shaped body is left to cool inside the mould for a sufficiently long period of time, to avoid deformation once extracted from the mould. As the expanded plastic material is an excellent thermal insulator, relatively long residence times in the mould are required to cool the shaped body;

evaluation of the moulded end-products in terms of appearance, sintering degree, etc.

It is known that to improve the processability of the expanded polystyrene particles, it is convenient to subject these, before the deposition of the coating, to thermal treatment, in the presence of at least one antistatic agent, which induces a considerable loss of expanding agent but at the same time produces an improvement in the properties such as:

low residence time in the mould;

low shrinkage of the moulded end-products after extraction from the mould;

high sintering degree;

reduced aging times;

high absorbing capacity of the pigments or other surface additives.

This treatment presumably causes modifications to the surface of the polymer which, in turn, determine the above improvements.

For instance, published European patent application 518.140 describes a process for the thermal treatment of expandable particles of styrene polymers, containing from 2 to 20% by weight of an expanding agent incorporated, which consists in:

covering these particles with an antistatic agent, for example with ethylene oxide-propylene oxide block copolymers having a content of ethylene oxide ranging from 10 to 50% by weight and having an average molecular weight of between 1,000 and 5,000, in a quantity not higher than 1% by weight;

removing a part of the expanding agent incorporated in the particles, by heating these to a temperature lower than the glass transition temperature of the styrene polymer;

rapidly cooling the particles to stop the evaporation of the expanding agent;

depositing the coating according to the usual procedures.

The expanded particles thus treated have very interesting characteristics, such as:

a) low residence time in the mould, generally equal to or less than 50% of the time necessary for cooling the blocks or end-products obtained from non-treated particles or particles treated with traditional systems;

b) shrinkage of the blocks or end-products, after extraction from the mould, of less than 1%;

c) a high sintering degree of the expanded particles;

d) short aging times after the pre-expansion phase;

e) high absorption capacity of pigments or other surface additives.

However, the partial removal of the expanding agent by heating to a temperature lower than the glass transition temperature of the material, for example between 35 and 50° C., also has its disadvantages. In fact, the loss of expanding agent which occurs with this operation is between 5 and 50% by weight of the total agent incorporated in the particle.

This loss reduces the possibility of preparing expanded products with a reduced density and also requires the necessity of recovering the expanding agent itself, generally with an aliphatic hydrocarbon with a low boiling point such as pentane or hexane, which must be recovered both for reasons of cost and environmental hygiene.

In addition, the same removal operation of the expanding agent requires very high treatment times and this greatly reduces the productivity.

The Applicant has now found a process for improving the processability of expanded particles of styrene polymers which overcomes the above drawbacks without reducing the properties (a)–(e) which can be obtained with the systems of the known art. This result has been made possible in that a new and inventive method has been found which enables the thermal treatment of the particle to be limited only to the surface of the particles themselves.

The present invention therefore relates to a process for the production of expandable particles of styrene polymers, having improved processability characteristics which comprises:

i) producing expandable particles of styrene polymers containing from 2 to 20% of an expanding agent incorporated;

ii) covering these particles with an antistatic agent in a quantity of less than 1% by weight (immediately before or after a screening phase);

iii) vigorously frictioning the particles in a mixing apparatus in order to heat their surface, in short times, by simple mechanical friction;

iv) discharging the particles thus treated from the mixing apparatus.

After following the operating steps (i)–(iv), the expandable products are ready to be treated with the coating according to the conventional procedures.

Owing to the specific treatment object of the present invention, i.e. a simple mechanical operation on the surface of the particles, and due to the poor thermal conductivity of styrene polymers, in particular polystyrene, the heating is limited to a small surface layer of the particles and therefore the increase in temperature is almost immediate.

In experimental practice it is not possible to measure the temperature increase which takes place on the surface of the beads, even if it can be estimated as being much higher than 100° C. In reality, what is measured with the thermometer is the temperature of the bulk immediately after the end of the treatment.

In particular, the benefits in the properties in transformation are significant results when the temperature of the bulk (mass of particles) is between 20 and 55° C.

According to the process of the present invention, owing to the particular treatment and poor conductivity of the polymer, the increase in temperature basically causes a partial removal of expanding agent which is limited to the surface layer in question of the particles. In fact, styrene polymers, and in particular polystyrene, have a low thermal conductivity and therefore, also thanks to the short friction treatment times, the body of the particle does not undergo any heating effect and consequently no loss of expanding agent.

The particles containing the expanding agent incorporated can be produced by carrying out the polymerization, preferably in aqueous suspension, of the styrene monomer, alone or mixed with one or more ethylenically unsaturated monomers copolymerizable with this, in the presence of the expanding agent. Other production methods are production in resuspension and in mass.

The polymerization can be carried out in the presence of at least one peroxidic initiator or thermally, according to the known and conventional processes.

Suspending agents available on the market can be used in the process of the present invention. The examples include products soluble in water such as polyvinylalcohol, methylcellulose, polyvinylpyrrolidone, etc. and products not very soluble such as magnesium pyrophosphate or calcium triphosphate.

Alternatively, the expanding agent can be incorporated into the performed styrene polymer by exposing the particles to the vapors of the expanding agent, or by introducing it into the particles already formed suspended in water or in extrusion. The various methods for the production of expandable particles are well known to experts in the field and are described in literature, for example in British patents 695.826; 715.100; 886.811; 908.089; 1.048.243; or in U.S. Pat. No. 2,983,692, whose contents form an integrant part of the present invention.

The term "styrene polymers" as used in the present invention and claims, comprises both the homopolymer of styrene and copolymers of styrene with other vinyl and/or vinylidene comonomers, containing at least 50% by weight of chemically combined styrene. Examples of these comonomers are $\alpha$-methylstyrene; vinyltoluene; p-methylstyrene; p-ethylstyrene; styrenes halogenated in the nucleus, such as 2,4-dichlorostyrene; acrylonitrile; methacrylonitrile; esters of $\alpha$, $\beta$-unsaturated carboxylic acids with alcohols containing from 1 to 8 carbon atoms, such as esters of acrylic and/or methacrylic acid; N-vinyl compounds, such as vinylcarbazole; anhydrides such as maleic, phthalic anhydride; etc.

The term copolymers of styrene also includes copolymers containing, as well as styrene and possibly the vinyl and/or vinylidene comonomers mentioned above, also small quantities of monomers containing two double bonds of the vinyl type, such as divinylbenzene.

The expandable particles of styrene polymers contain as expanding agents conventional organic compounds which are easily volatile, gaseous or liquid at room temperature, which do not dissolve the polymer but expand it and whose boiling point is lower than the softening point of the polymer.

Examples of particularly suitable expanding agents are aliphatic hydrocarbons, alone or mixed with each other, containing from 2 to 6 carbon atoms such as propane, butane, n-pentane, i-pentane, hexane, cyclohexane, etc. petroleum ether; halogenated derivatives of aliphatic hydrocarbons containing from 1 to 3 carbon atoms, such as the various chloro and fluoro derivatives of methane, ethane or ethylene, for example dichlorodifluoromethane; 1,2,2-trifluoroethane; 1,1,2-trifluoroethane; carbon dioxide; etc.

The expanding agent is generally used in a quantity ranging from 2 to 20% and, preferably, from 4 to 10% by weight with respect to the polymer.

As well as the expanding agents, the polymers of styrene can contain other additives, such as for example flame-extinguishing agents, organic and inorganic loadings, dyes, pigments, antipacking agents, plasticizers, etc.

The polymerization of styrene, preferably in aqueous suspension, the addition of the expanding agent, preferably during the polymerization and the transformation of the particles into shaped bodies, by moulding in closed forms, are carried out according to the techniques well known to experts in the field, which are widely described in literature, such as for example in "Rigid Plastic Foams", by T. N. Ferrigno, Reinhold Publishing Corp. New York, U.S.A. (1963).

The antistatic agents used in the process of the present invention are those generally proposed for improving the flowability; finish and processability surface properties of the particles of styrene polymers.

These antistatic agents are well known and described in literature, for example in Kirk-Othmer, *ENCYCLOPEDIA OF CHEMICAL TECHNOLOGY*, Vol. 3, 1992, page 540. Examples of antistatic agents which can be used in the process of the present invention comprise: esters of fatty acids, such as for example butyl stearate; mono- or polyhydric alcohols, such as for example glycerol; amines, such as for example an ethyoxylated tertiary alkylamine, a dialkanolamine of fatty acids; amides, such as for example N,N-bis-(2-hydroxyethyl-stearamide); polyoxyethylene or polyoxyalkylene derivatives, such as for example hexadecylether of polyethyleneglycol; ethylene oxide-propylene oxide copolymers; aminic soaps, such as for example the salt of stearic acid and octadecylamine; alkylsulfated aminicides, such as for example the salt of guanidine and octadecylsulfate; compounds of quaternary ammonium, such as for example octadecyl-trimethylammonium chloride; alkylphosphates, such as for example acid bis-dodecylphosphate; aminic salts of alkylphosphonic acids, such as for example the salt of triethanolamine, and octadecylphosphonic acid; etc.

These antistatic agents can be used alone or mixed with each other in any ratio.

The preferred antistatic agents in the process of the present invention are: fatty alcohols condensed with ethylene oxide and propylene oxide known on the market under the trade-name DEHYPON® of Henkel or ethoxylated tertiary alkylamines such as the product HOSTASTAT® of Hoechst.

The quantity of antistatic agent is generally not more than 1% by weight with respect to the polymer, for example from 0.001 to 0.5% and preferably from 0.01 to 0.1%.

The coating of the polymer particles with the antistatic agent can be carried out using any known mixing method. For example, the expandable particles can be treated with the appropriate quantity of antistatic agent in a rotating drum or screw mixer.

The coating of the particles with the antistatic agent facilitates subsequent screening operations, sometimes necessary for obtaining fractions, each with homogeneous dimensions, destined for various kinds of use.

The vigorously frictioning operation consists in inducing strong friction of the particles against each other and together against the walls of the device used for this purpose. Any device capable of vigorously frictioning polymeric particles can be used in the process of the present invention. A suitable device may be a screw mixer, with rotating blades, etc., capable of operating both in continuous and in batch, normally used as a means for mixing additives such as dyes, stabilizers, coatings, etc. with thermoplastic polymers such as PVC, ABS, polyethylene, polypropylene, expandable polystyrene, etc.

In any case the device used must be such as to allow a rapid heating of the surface in a time range which varies in relation to the dimensions of the particles and the type of device itself (device for operating in continuous or batch).

In the functioning phase, therefore, the polymeric particles charged undergo a strong friction which causes an increase in the temperature on the surface of each of these with a consequent release of the expanding agent. As the heating effect, and therefore the evaporating effect of the expanding agent, remains solely limited to the surface of the bead, the loss in expanding agent is very much limited but, inspite of this, it guarantees the acquisition of the desired properties.

Some illustrative but non-limiting examples are provided for a better understanding of the present invention and for its embodiment.

EXAMPLE 1 (Comparative)

20 Kg of particles of polystyrene having a weight average molecular weight of 180,000, an average diameter ranging from 0.2 to 2.7 mm and containing an expanding agent incorporated consisting of a mixture of n-pentane and iso-pentane in a weight ratio 70/30, were obtained by the polymerization of styrene, in an aqueous suspension, at a temperature ranging from 85 to 120° C. and in the presence of dibenzoyl peroxide and ter-butyl perbenzoate as catalysts.

The particles leaving the polymerization reactor were washed with water, centrifuged and dried at 20° C. for 1 hour. The content of expanding agent measured was 6.8% by weight.

300 ppm of an antistatic agent were added to the expandable particles, consisting of a fatty alcohol condensed with ethylene oxide and propylene oxide having a ratio in moles of 5:4 and a molecular weight ranging from 500 to 700, known on the market as DEHYPON LS®. The addition was carried out in a screw mixer, at room temperature, for a period of about 10 prime minutes.

The particles were then screened, separating the fraction with an average diameter ranging from 0.4 to 0.9 mm.

A mixture of coating agents consisting of 0.2% by weight with respect to the polymer, of glyceryl mono-stearate and 0.05% of zinc stearate were added to the particles, which were then pre-expanded with vapor at 95°–100° C. until the minimum density of 16 g/l was reached. After aging in air at room temperature for 24 hours, the particles were moulded to produce containers having dimensions of 40×60×2 cm. The moulding was carried out with vapor at 0.9 Ate.

The containers thus obtained had a sintering degree, referring to the percentage of expanded particles which split after breakage of the bottom of the container, of 15%. The sintering percentage was determined by defining a breakage section of about 10 $cm^2$, counting the total number of expanded particles in this section and calculating the number of those which were broken with respect to the total number.

The cooling time of the containers was determined, intended as the residence time in the mould necessary for the end-product to maintain the dimensions of the mould once extracted. The cooling time of the containers proved to be 5 prime minutes.

EXAMPLE 2 (Comparative)

The same procedure was adopted as in example 1 up to the screening, separating the fraction with an average diameter ranging from 0.4 to 0.9 mm.

The particles were then charged into an oven and heated to 35° C. until the content of expanding agent was reduced to 5% by weight. A mixture of coating agents was added to the particles, consisting of 0.2% by weight, with respect to the polymer, of glyceryl monostearate and 0.05% of zinc stearate, and the particles were then pre-expanded with vapor at 95–100° C. until the minimum density of 22 g/l was reached.

After aging in air at room temperature for 24 hours, the particles were moulded as described in example 1. The sintering degree proved to be 80% and the cooling time 2'45".

EXAMPLE 3

The same procedure was adopted as in example 1 up to the screening, separating the fraction with an average diameter ranging from 0.4 to 0.9 mm. The content of pentane was 6.8% and the temperature 23° C.

The particles were fed to a counter-rotating blade mixer and processed until a temperature of 35° C. was reached. The material was then discharged and left to cool for 20' at room temperature. The content of pentane was 6.5%.

A mixture of coating agents was added to the particles thus treated, consisting of 0.2% by weight, with respect to the polymer, of glyceryl monostearate and 0.05% of zinc stearate, and the particles were then pre-expanded with vapor at 95–100° C. until the minimum density was reached (17 g/l).

After aging in air at room temperature for 24 hours, the particles were moulded to produce containers having dimensions of 40×60×2 cm. The moulding was carried out with vapor at 0.9 Ate.

The containers thus obtained had a sintering degree of 85% and a cooling time of 2'30".

EXAMPLE 4

The same procedure was carried out as in example 3 up to the pre-expansion with vapor at 95–100° C. until the minimum density was reached (17 g/l).

After aging in air at room temperature for 5 hours, the particles were moulded to produce containers having dimensions of 40×60×2 cm. The moulding was carried out with vapor at 0.9 ate.

The containers thus obtained had a sintering degree of 70% and a cooling time of 3'.

EXAMPLE 5 (Comparative)

The same procedure was adopted as in example 1 up to the screening, separating the fraction with an average diameter ranging from 0.9 to 2.7 mm. The content of pentane was 6.9%.

A mixture of coating agents was added to the particles thus treated, consisting of 0.2% by weight, with respect to the polymer, of glyceryl monostearate and 0.05% of zinc stearate, and the particles were then pre-expanded with vapor at 95–100° C. until the minimum density was reached (14 g/l).

After aging in air at room temperature for 24 hours, the particles were moulded to produce blocks having dimensions of 100×100×50 cm. The moulding was carried out with vapor at 0.65 ate The blocks thus obtained had a sintering degree of 5% and a cooling time of 20'.

EXAMPLE 6 (Comparative)

The same procedure was adopted as in example 1 up to the screening, separating the fraction with an average diameter ranging from 0.9 to 2.7 mm. The content of pentane was 6.9%.

The particles were then charged into an oven and heated to 35° C. until the content of expanding agent was reduced to 5.1% by weight. A mixture of coating agents was added to the particles, consisting of 0.2% by weight, with respect to the polymer, of glyceryl monostearate and 0.05% of zinc stearate, and the particles were then pre-expanded with vapor at 95–100° C. until the minimum density of 20 g/l was reached.

After aging in air at room temperature for 24 hours, the particles were moulded to produce blocks having dimensions of 100×100×50 cm. The moulding was carried out with vapor at 0.65 ate.

The blocks thus obtained had a sintering degree of 50% and a cooling time of 9'.

EXAMPLE 7

The same procedure was adopted as in example 1 up to the screening, separating the fraction with an average diameter ranging from 0.9 to 2.7 mm. The content of pentane was 6.9% and the temperature 23° C.

The particles were fed to a counter-rotating blade mixer and processed until a temperature of 35° C. was reached. The material was then discharged and left to cool for 20' at room temperature. The content of pentane was 6.6%.

A mixture of coating agents was added to the particles thus treated, consisting of 0.2% by weight, with respect to the polymer, of glyceryl monostearate and 0.05% of zinc stearate, and the particles were then pre-expanded with vapor at 95–100° C. until the minimum density was reached (15 g/l).

After aging in air at room temperature for 24 hours, the particles were moulded to produce blocks having dimensions of 100×100×50 cm. The moulding was carried out with vapor at 0.65 ate.

The blocks thus obtained had a sintering degree of 55% and a cooling time of 8.30'.

The results of examples 1–7 are summarized in tables I and II.

TABLE 1

| | Initial pentane % | Final pentane % | Minimum density g/l | Sintering % | Cooling time | Aging hrs |
|---|---|---|---|---|---|---|
| Ex. 1 comp. 0.4–0.9 mm | 6.8 | 6.8 | 16 | 15 | 5' (0.9 Ate) | 24 |
| Ex. 2 comp. 0.4–0.9 mm | 6.8 | 5.0 | 22 | 80 | 2'45" (0.9 Ate) | 24 |
| Example 3 0.4–0.9 mm | 6.8 | 6.5 | 17 | 85 | 2'30" (0.9 Ate) | 24 |
| Example 4 0.4–0.9 mm | 6.8 | 6.5 | 17 | 70 | 3' (0.9 Ate) | 5 |

TABLE 2

| | Initial pentane % | Final pentane % | Minimum density g/l | Sintering % | Cooling time | Aging hrs |
|---|---|---|---|---|---|---|
| Ex. 5 comp. 0.9–2.7 mm | 6.9 | 6.9 | 14 | 5 | 20' (0.65 Ate) | 24 |
| Ex. 6 comp. 0.9–2.7 mm | 6.9 | 5.1 | 20 | 50 | 9' (0.65 Ate) | 24 |
| Example 7 0.9–2.7 mm | 6.9 | 6.6 | 15 | 55 | 8'30" (0.65 Ate) | 24 |

The Italian priority application No. MI97A 000173 is herein incorporated by reference.

What is claimed is:

1. A process for the production of expandable particles of styrene polymers, having improved processability characteristics, which comprises:
   i) producing expandable particles of styrene polymers containing from 2 to 20% by weight of an expanding agent;
   ii) coating these particles with an antistatic agent in a quantity of less than 1% by weight;
   iii) subsequent to said coating, and in a separate step, vigorously frictioning the particles in a mixing apparatus in order to heat their surface, by simple mechanical friction alone;
   iv) discharging the particles thus treated from the mixing apparatus.

2. The process according to claim 1, wherein the friction is such as to heat the mass of particles to a temperature ranging from 20 to 55° C.

3. The process according to claim 1, wherein the particles of styrene polymers containing the expanding agent are produced by carrying out the polymerization in an aqueous suspension of a styrene monomer, alone or mixed with one or more ethylenically unsaturated monomers copolymerizable with this, in the presence of the expanding agent.

4. The process according to claim 3, wherein the suspending agents are selected from the group consisting of products soluble in water such as polyvinylalcohol, methyl-cellulose, polyvinylpyrrolidone and not very soluble products such as magnesium pyrophosphate or calcium triphosphate.

5. The process according to claim 3, wherein the expanding agent is selected from the group consisting of aliphatic hydrocarbons, alone or mixed with each other, containing from 2 to 6 carbon atoms; petroleum ether; halogenated derivatives of aliphatic hydrocarbons containing from 1 to 3 carbon atoms; and carbon dioxide.

6. The process according to claim 1, wherein the antistatic agents are selected from the group consisting of the esters of fatty acids; mono- or polyhydric alcohols; amines; amides; polyoxyethylene or polyoxyalkylene derivatives; ethylene oxidepropylene oxide copolymers; aminic soaps; alkylsulfated aminicide salts; compounds of quaternary ammonium; alkylphosphates; and aminic salts of alkylphosphonic acids; and mixtures thereof.

7. The process according to claim 1, wherein the quantity of antistatic agent is between 0.001 and 0.5% by weight.

8. The process according to claim 1, wherein the vigorous friction operation is carried out by means of a screw mixer or a rotating blade mixer.

9. The process according to claim 6, wherein the antistatic agents are selected from the group consisting of butyl stearate, glycerol, ethoxylated tertiary alkylamine, fatty acid dialkylanolamine, N, N-bis-(2-hydroxyethylstearamide), hexadecylether of polyethyleneglycol, salt of stearic acid and octadecylamine, salt of guanidine and octadecylsulfate, octadecyl-trimethylammonium chloride, acid bis-dodecylphosphate, and salt of triethanolamine and octadecylphosphonic acid, and mixtures thereof.

10. The process according to claim 1, wherein the antistatic agent is selected from the group consisting of fatty alcohols condensed with ethylene oxide, fatty alcohols condensed with propylene oxide, and ethoxylated tertiary alkylamines, and mixtures thereof.

* * * * *